United States Patent
Mulwad et al.

(10) Patent No.: US 10,606,953 B2
(45) Date of Patent: Mar. 31, 2020

(54) SYSTEMS AND METHODS FOR LEARNING TO EXTRACT RELATIONS FROM TEXT VIA USER FEEDBACK

(71) Applicant: General Electric Company, Schenectady, NY (US)

(72) Inventors: Varish Vyankatesh Mulwad, Niskayuna, NY (US); Kareem Sherif Aggour, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 15/836,064

(22) Filed: Dec. 8, 2017

(65) Prior Publication Data
US 2019/0179893 A1 Jun. 13, 2019

(51) Int. Cl.
*G06F 17/21* (2006.01)
*G06F 17/27* (2006.01)
*G06F 16/38* (2019.01)
*G06N 5/00* (2006.01)

(52) U.S. Cl.
CPC .......... *G06F 17/2785* (2013.01); *G06F 16/38* (2019.01); *G06F 17/277* (2013.01); *G06F 17/278* (2013.01); *G06F 17/2715* (2013.01); *G06N 5/00* (2013.01)

(58) Field of Classification Search
CPC ........ G06F 17/21; G06F 17/20; G06F 17/212; G06F 17/218; G06F 17/24; G06F 17/241; G06F 17/248; G06F 17/27; G06F 17/2705; G06F 17/271; G06F 17/2755; G06F 17/2775; G06F 17/2785

USPC .................... 704/9, 1, 10, 257, 276
See application file for complete search history.

(56) References Cited

U.S. PATENT DOCUMENTS

| | | | |
|---|---|---|---|
| 8,494,987 B2 | 7/2013 | Katukuri et al. | |
| 9,037,615 B2 | 5/2015 | Bornea et al. | |
| 9,092,789 B2 | 7/2015 | Anshul | |
| 9,348,815 B1 * | 5/2016 | Estes | G06F 17/2785 |
| 9,442,917 B2 | 9/2016 | Dou et al. | |
| 9,697,192 B1 | 7/2017 | Estes et al. | |
| 2007/0156748 A1 | 7/2007 | Emam et al. | |
| 2014/0067370 A1 | 3/2014 | Brun | |

(Continued)

OTHER PUBLICATIONS

Toti et al., "A Knowledge Discovery Methodology for Semantic Categorization of Unstructured Textual Sources", 2012 Eighth International Conference on Signal Image Technology and Internet Based Systems, pp. 944-951, Naples, Nov. 25-29, 2012, 8 pp.

(Continued)

*Primary Examiner* — Qi Han
(74) *Attorney, Agent, or Firm* — Buckley, Maschoff & Talwalkar LLC

(57) ABSTRACT

According to some embodiments, a system and method are provided to extract relationships from unstructured text documents. The method comprises receiving a training set of sentences that comprise labeled objects and subjects for creating an initial relationship model. A set of unlabeled sentences may be received. Objects and subjects from the set of unlabeled sentences are determined based on the initial model and the determined objects and subjects from the set of unlabeled sentences are displayed to a user for feedback and approval. An indication of whether the determined objects and subjects from the set of unlabeled sentences are correct is received and the initial relationship model is updated based on the received indication.

15 Claims, 4 Drawing Sheets

(56) References Cited

U.S. PATENT DOCUMENTS

2017/0169103 A1    6/2017  Juneja et al.
2017/0177715 A1*  6/2017  Chang .................. G06F 17/2785
2018/0365560 A1*  12/2018  Qiao ........................ G06N 3/08

* cited by examiner

| Document ID | Property | Property | Property | Property | Property |
|---|---|---|---|---|---|
| 1 | | | | | |
| 2 | | | | | |
| 3 | | | | | |

SYSTEMS AND METHODS FOR LEARNING TO EXTRACT RELATIONS FROM TEXT VIA USER FEEDBACK

BACKGROUND

Extracting relationships from unstructured text remains a challenging problem because conventional approaches work based on either using manually-defined extraction rules, which tend to be very brittle, or learning relationships from text, which usually requires 1000s of hand-curated training examples. Unstructured text such as, but not limited to, unstructured log files, industrial asset shop visit reports, electronic medical data is not annotated. Having a domain expert manually annotate 1000s of examples from such datasets to develop new extraction rules is extremely time consuming and costly.

It would therefore be desirable to provide a system to extract relationships from unstructured text that requires neither 1000s of hand-curated examples nor text mining expertise.

SUMMARY

Some embodiments described herein relate to a system and a method to extract relationships from text. The method comprises receiving a training set of sentences that comprise labeled objects and subjects for creating an initial relationship model. A set of unlabeled sentences may be received. Objects and subjects from the set of unlabeled sentences may be determined based on the initial model and the determined objects and subjects from the set of unlabeled sentences may be displayed to a user for approval. An indication of whether the determined objects and subjects from the set of unlabeled sentences are correct may be received and the initial relationship model may be updated based on the received indication.

A technical advantage of some embodiments disclosed herein are improved systems and methods for the early alerting of potential problems associated with assets prior to secondary damage being done to the asset and/or the asset's surroundings.

DETAILED DESCRIPTION

In the following detailed description, numerous specific details are set forth in order to provide a thorough understanding of the embodiments. However, it will be understood by those of ordinary skill in the art that the embodiments may be practiced without these specific details. In other instances, well-known methods, procedures, components and circuits have not been described in detail so as not to obscure the embodiments.

The present embodiments relate to a system and method associated with dynamically defining new relations from unstructured text by annotating a small number (e.g., less than 30) examples instead of 1000s of examples as required by the prior art. The system described herein may also be interactive in nature by providing feedback and validation to improve the accuracy of determined relation extraction rules over time. For example, the system described herein may allow domain experts to gradually define new relations over a period of time without needing any expertise in text mining. Moreover, users may only be expected to provide the system with a few annotations over time to determine new relations and the system may automatically learn and improve from the user feedback and interaction.

Figure 1:
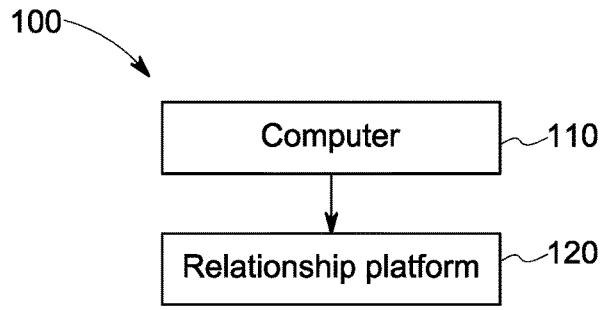
FIG. 1 illustrates a system in accordance with some embodiments.

Now referring to FIG. 1, an embodiment of a system 100 is illustrated. As illustrated in FIG. 1, the system 100 may comprise a computer 110 that electronically stores an unstructured text document. The system 100 further comprises a relationship platform 120 to determine relations in the unstructured text document. The computer 110 may comprise, but is not limited to, a general computing device or an industrial asset. An industrial asset may comprise, but is not limited to, generators, gas turbines, power plants, manufacturing equipment on a production line, aircraft engines, wind turbines that generate electricity on a wind farm, power plants, locomotives, healthcare or imaging devices (e.g., X-ray or MRI systems) for use in patient care facilities, or drilling equipment for use in mining operations.

The relationship platform 120 may receive a training set of sentences comprising labeled objects and subjects for creating an initial relationship model from the computer 110. Once the initial relationship model has been created, the relationship platform 120 may receive an unstructured document comprising unlabeled sentences. From the unlabeled sentences, objects and subjects may be determined based on the initial model. The relationship platform 120 may display the determined objects and subjects from the unlabeled sentences to a user and wait for the user to indicate (e.g., an approval from the user) whether the determined relationship (e.g., the relationship between the subject and object) is correct. The relationship platform 120 may receive, from the user, an indication of whether each determined object and subject from the unlabeled sentences is correct. Moreover, the initial relationship model may be updated based on the received indication to improve performance of the model. The process of determining a relation from unstructured text will now be described in more detail with respect to FIG. 2, FIG. 3 and FIG. 4.

Figure 2:
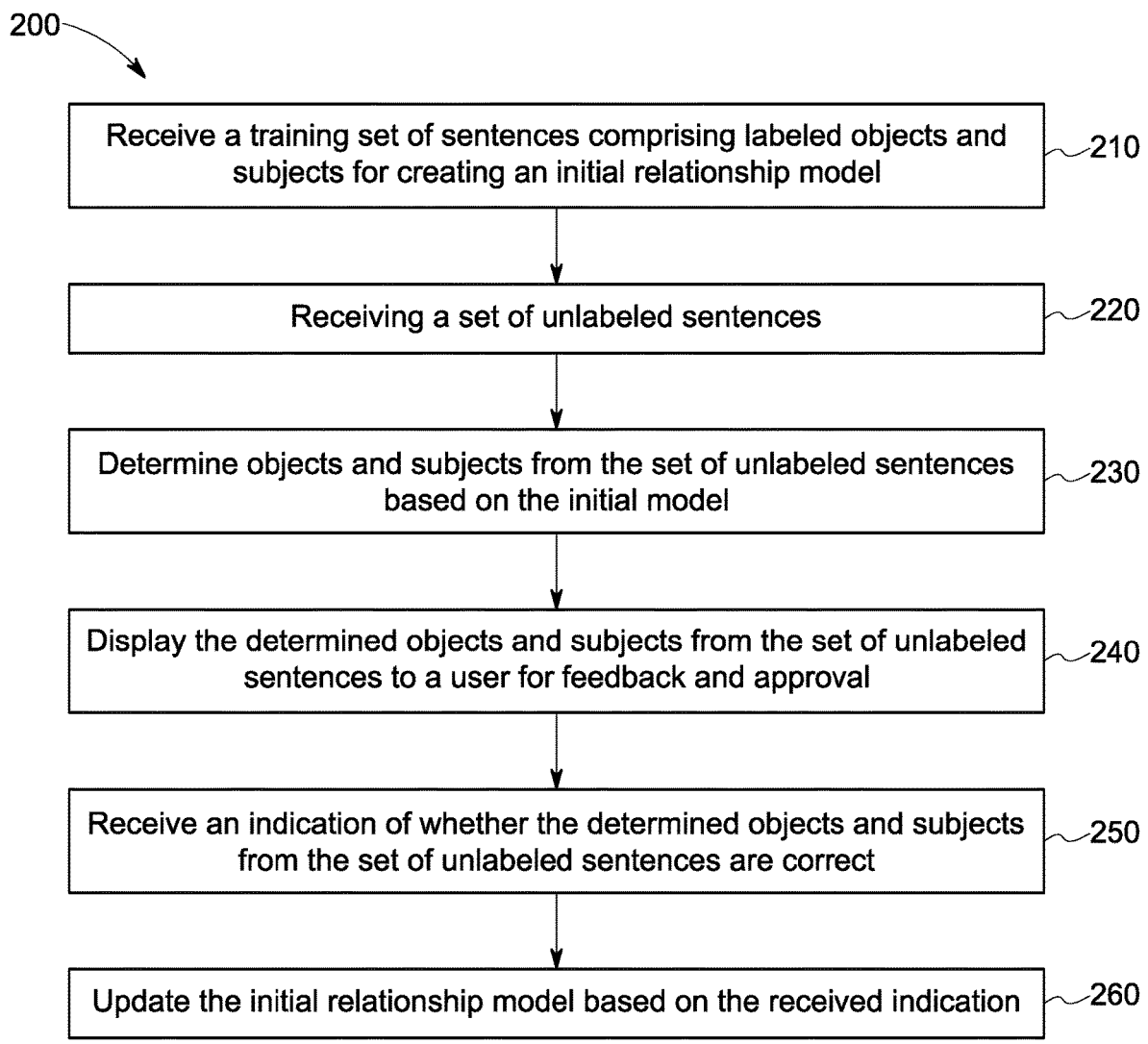
FIG. 2 illustrates a method in accordance with some embodiments.

Now referring to FIG. 2, a method 200 that might be performed by the relationship platform 120 of the system 100 described with respect to FIG. 1 is illustrated according to some embodiments. The flow chart described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Method 200 may relate to machine learning of user-defined relations from an unstructured text based on a limited amount of initial training data by incorporating user interaction and feedback with an initial relationship model to improve the extraction accuracy over time.

Now referring to 210, a training set of sentences comprising labeled objects and subjects for creating an initial relationship model is received. The training set of sentences may be provided from a user that has annotated a small number of sentences (e.g., 15-20 sentences per defined relation) with information such as the relation name and a subject and an object for each defined relation.

For purposes of illustrating features of the present embodiments, some simple examples will now be introduced and referenced throughout the disclosure. Those skilled in the art will recognize that these examples are illustrative and are not limiting and are provided purely for explanatory purposes.

A training set of sentences may comprise the following sentences: "Barack Obama was born on Aug. 4, 1961."; "Mitch McConnell was born on Feb. 20, 1942."; and "Paul Ryan was born on Jan. 29, 1970". Each sentence may be annotated with a subject and an object. For example, the first sentence may be annotated with a subject of Barack Obama and an object of Aug. 4, 1961 where the relationship is labeled as "born on". Similarly, the next two training sentences may be annotated with subjects of Mitch McConnell and Paul Ryan, respectively, and objects Feb. 20, 1942 and Jan. 29, 1970, respectively.

The embodiments described herein may learn both a syntactic context and a semantic context in which the subject and object appear from the annotated examples. The syntactic context and the semantic context may further be used to generate a set of relation extraction rules in a form of semantic regular expressions. The learnt extraction rules may further be applied to unlabeled sentences to extract new subject-object pairs associated with one or more user-defined relations per sentence.

At 220, a set of unlabeled sentences may be received. The unlabeled sentences may be received as a second training set of sentences or may be a portion of an unstructured text document. The unlabeled sentences may comprise a set of sentences that include similar objects and subjects as the training set but are unlabeled (e.g., the unlabeled sentences do not comprise annotated subjects and objects). A system may automatically extract initial subjects, objects and relations, and then select a sample from the processed sentences and present them to the user for feedback and validation.

Continuing with the above examples, the unlabeled sentences may comprise the following sentences: "Bill Clinton was born in Arkansas on Aug. 19, 1946." and "George Bush was born in Connecticut on Jul. 6, 1946".

At 230, objects and subjects from the set of unlabeled sentences are determined based on the initial model. Based on the initial training set and the initial training model, the system may attempt to determine an object and subject from each sentence of the set of unlabeled sentences. In a first example, for the sentence "Bill Clinton was born in Arkansas on Aug. 19, 1946.", the system may determine a subject of Bill Clinton with an object of Arkansas. At 240, the determined object and subject from each of the set of unlabeled sentences may be displayed to a user for approval. Users may provide feedback on the accuracy of the subject, accuracy of the object and on the relationship label for the subject-object pairs. Additionally, users may annotate additional subjects or objects in the sampled sentence that the system failed to tag. Continuing with the above example, the system may present to the user the sentence of "Bill Clinton was born in Arkansas on Aug. 19, 1946." and indicate that the subject is Bill Clinton and the object is Arkansas.

At 250 an indication of whether the determined objects and subjects from the set of unlabeled sentences are correct may be received. The received indication may be used by the system to evolve the extraction rules. The updated extraction rules may be reapplied on the remaining untagged sentences to extract new subject-object pairs for user validation. Continuing with the above example, the user may indicate that, in regard to the sentence "Bill Clinton was born in Arkansas on Aug. 19, 1946", the presented subject is correct (i.e., Bill Clinton) and the user may also indicate that the presented object (i.e., Arkansas) is incorrect. Furthermore, the user may indicate that the correct object should have been "Aug. 19, 1946" for the relation "born on". Next, at 260, the initial relationship model may be updated based on the received indication. Updating may comprise updating information in a database associated with the initial relationship model. This loop may continue until the system reaches a desired level of accuracy after which the system may be used for text classification without periodic user feedback (although users can always choose to provide feedback on more sentences and further train the model if they so choose).

Continuing with the above example, the system may present to the user the sentence of "George Bush was born in Connecticut on Jul. 6, 1946" and indicate that presented subject of "George Bush" and the presented object of "Jul. 6, 1946" for the relation "born on" is correct. The user may indicate that the presented subject is correct (i.e., George Bush) and the user may indicate that the presented object is also correct (i.e. Jul. 6, 1946).

Figure 3:
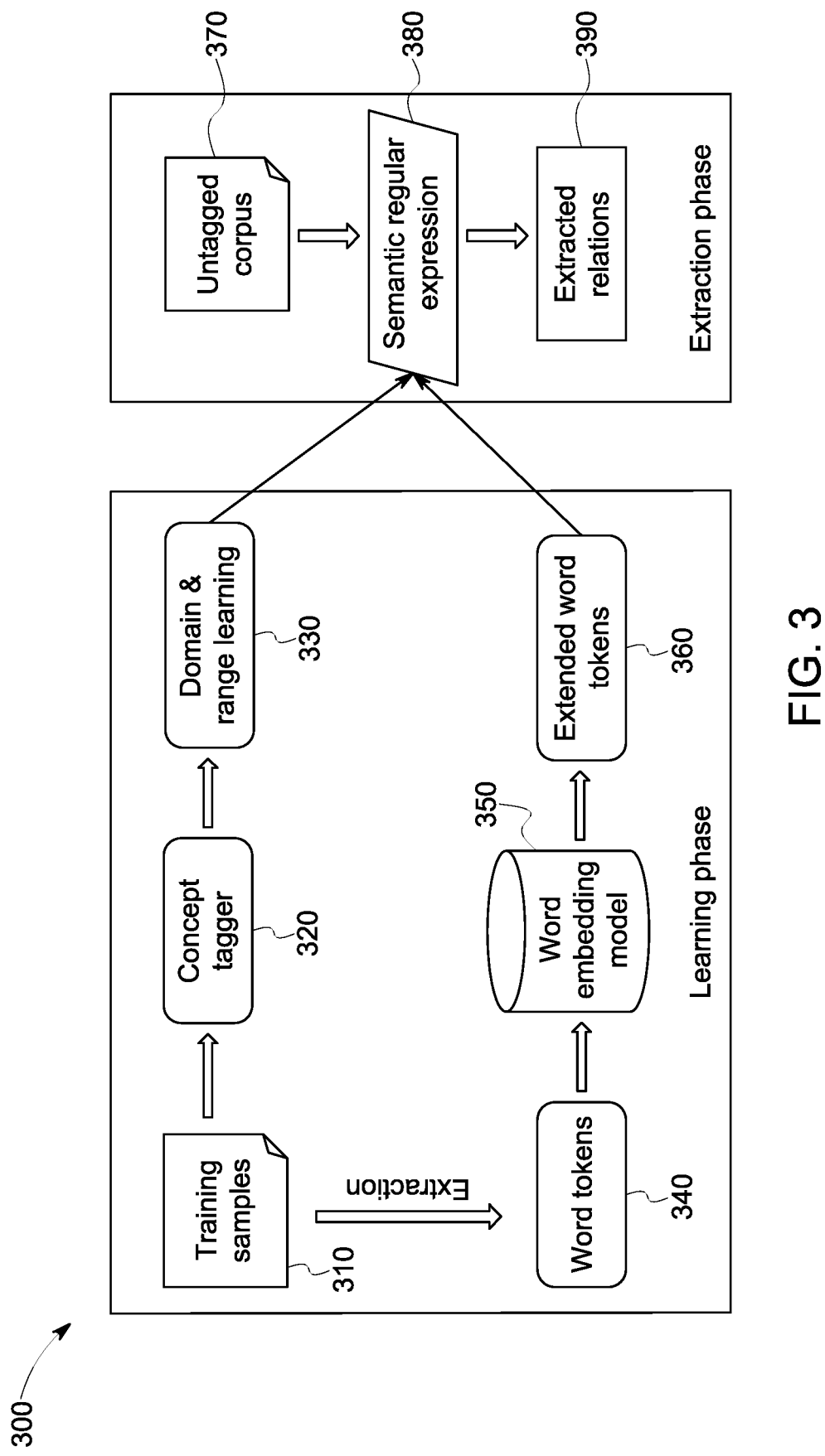
FIG. 3 illustrates a process in accordance with some embodiments.
Figure 4:
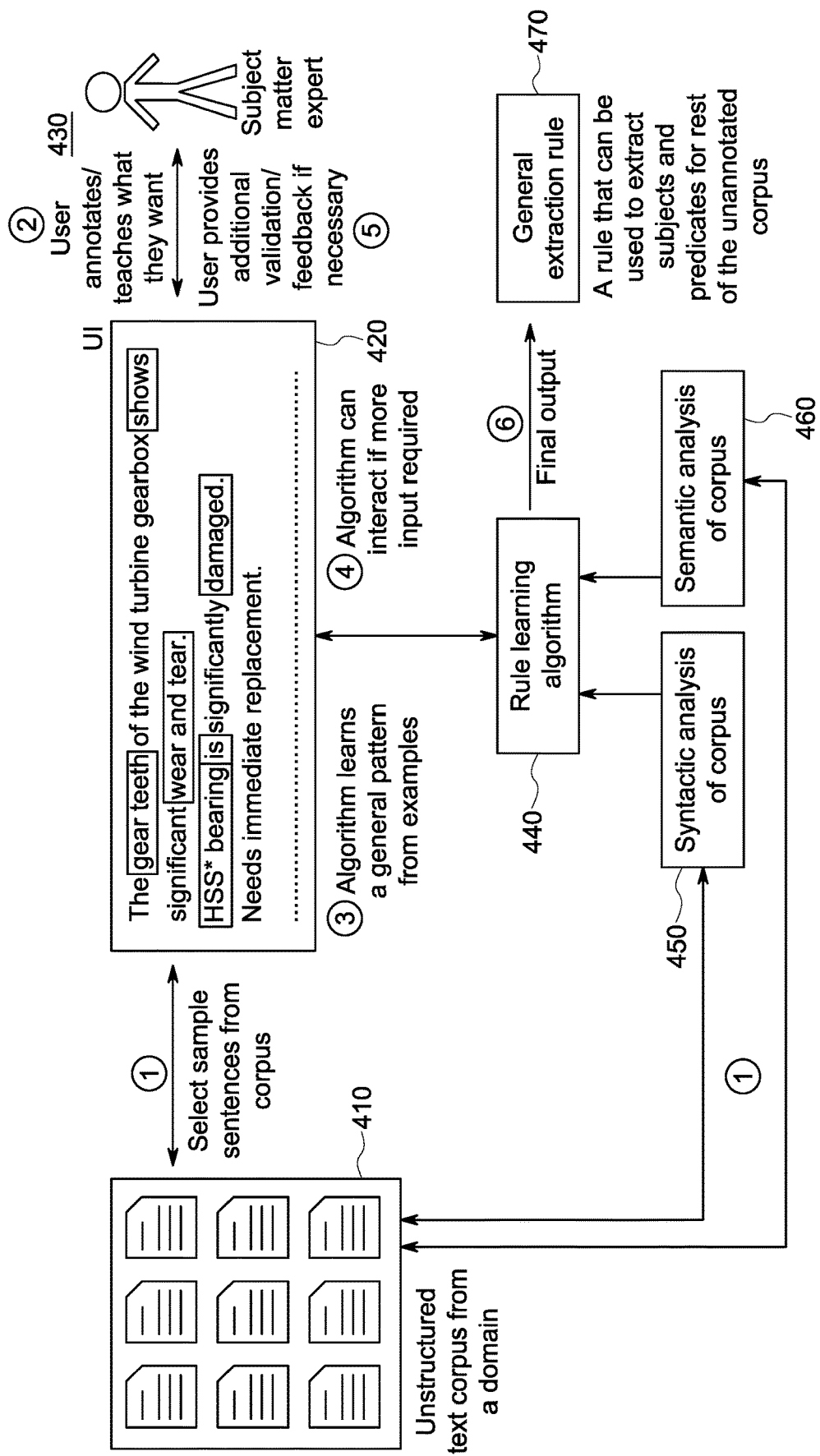
FIG. 4 illustrates a process in accordance with some embodiments.

The method 200 of FIG. 2 may be explained in more detail with respect to FIG. 3. The process 300, of FIG. 3, may be performed by the relationship platform 120 of the system 100 described with respect to FIG. 1. The process flow described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

At 310, a system may begin by receiving an unstructured and unannotated text document 370 provided by a user. The system or the user may select a small sample of sentences from the unstructured and unannotated text document 370 to serve as training samples to bootstrap the process 300. For each sentence in the training samples, the user may annotate information such as a relation name, a subject and an object for the defined relation. The annotated sentences may be submitted to a rule learning algorithm that may associate the defined relation with the annotated subject and the annotated object. Extracting the relation may comprise two phases: a learning phase and an extraction phase.

During the learning phase, the system may learn a general extraction rule for every relation based on the syntactic and semantic patterns that appear in the training samples 310. To identify common syntactic patterns for a given relation, the system may first identify word tokens 340 that appear between the subject and object in the training examples. For example, in the sentence "Barack Obama was born on Aug. 4, 1961", the words "was born on" appear between the subject "Barack Obama" and the object "Aug. 4, 1961". As such, the words "was born on" comprise word tokens 340. Word tokens may be defined as the words located between the subject and the object.

The system may further extend the list of word tokens 340 by identifying similar words using a word embedding model 350 that is trained based on the original small sampling of unstructured, annotated text training samples 310. Furthermore, the current analysis provides an initial list of word tokens 340 which may be generated as a word token list. The top X word tokens (e.g., where X is a whole number such as 5) may be used to determine similar word tokens such as synonyms which may be retrieved from a data base and these similar word tokens may be added to the list of word tokens and assigned a weight. For example, the original words from the unstructured and unannotated text document may be assigned a weight of 1 (e.g., "was born on" is assigned a weight of 1), whereas the weight of the extended similar words 360 may be set to a similarity score based on the original words (e.g., the determined word tokens). In this example, tokens of "has a birth date of" and "birthday" may be determined. The word token "has a birth date of" may be assigned a weight of 2 and "birthday" may be assigned a weight of 3.

The system may also use a concept tagger 320 to determine semantic relationships (e.g., relationships based on a meaning of the words), determine domains and determine a range of objects and subjects of a sentence. The concept tagger 320 may tag the unstructured and unannotated text document so that the words of the unstructured and unannotated text document may be matched to labels that are defined in the model and are associated with known relations. In some embodiments, the concept tagger 320 may perform string matches to the existing labels in the model. In some embodiments, the concept tagger 320 may identify the semantic type for the subject and object by mapping them to known entities from a knowledge graph.

Common semantic patterns may be identified by learning the domain and range 330 for a given relation. The semantic type of the subject may typically be referred to as the domain and the semantic type of the object may be referred to as the range of any given relation.

Continuing with the above example, based on analyzing the sentence "Barack Obama was born on Aug. 4, 1961.", Barack Obama is the domain and the system may classify Barack Obama as either a politician, a president or a person based on a semantic analysis. Furthermore, the range might be "birth date". This analysis may be performed for all data samples and then a most frequent pair may be selected. Determining the domain may be based on matching subjects to a database of previously defined subjects to learn more about the subject. In some embodiments, data associated with the subject may be hard coded in software instead of using a database query. For example, in the original example related to Barack Obama, Mitch McConnell and Paul Ryan, Barack Obama is a former president and the other two are politicians. Therefore, for this example, the domain will be determined to be "politician" since all three individuals are politicians but only one is a former president. Regarding the example of related to "George Bush was born in Connecticut on Jul. 6, 1946" and "Bill Clinton was born in Arkansas on Aug. 19, 1946", since both men are former presidents and politicians, the domain may be either "president" or "politician".

The system described herein may select a most frequently occurring subject-object semantic type pair as the domain and range for the relation. The learnt domain, range and the word token list may be used to generate a set of semantic regular expressions 380 which form the basis for the relation extraction rule. A semantic regular expression may take the form of "Domain word token(s) Range."

The system may then use these semantic regular expressions during the extraction phase to extract relations 390 such as new subject-object pairs from the unstructured and unannotated text corpus 370. In doing so, the system may select a sample from the newly tagged sentences and present them to a user for feedback and validation and, in response, the user may provide feedback on the accuracy of the subject, object and the relationship label for the subject-object pair. For example, and now referring to FIG. 4, samples 420 may be selected from an unstructured text corpus 410 and, based on these samples 420, a rule learning algorithm 440 may learn a general pattern from the samples 420. Additionally, users may annotate 430 additional subjects or objects in the sampled sentence that the system failed to tag. The user feedback may be used to fine-tune a semantic regular expression. In parallel to generating samples, a syntactic analysis 450 of the text corpus 410 and a semantic analysis 460 of the text corpus 410 may be performed. The syntactic analysis 450 and the semantic analysis 460 of the corpus may be used in conjunction with the rule learning algorithm to generate an extraction rule 470.

For system maintenance, being able to determine relations from unannotated text may be used to build anomaly databases from log files so that fault monitoring of industrial assets may more accurately determine anomalies from operating data and/or from log data. Determining anomalies in an industrial asset prior to the industrial asset breaking down can minimize downtime to the industrial asset since the industrial asset can be taken offline at a convenient time. Furthermore, finding relations based on anomalies, and as such making quicker determinations about anomalies, can prevent an industrial asset from causing damage to the industrial asset or its surroundings. In a real-world example, determining a likelihood of a locomotive failing based on relations in a log file may provide an early indication of a wheel warping or an engine breaking down which can prevent loss of rail service or potentially loss of life should the locomotive derail.

Figures 5, 6:
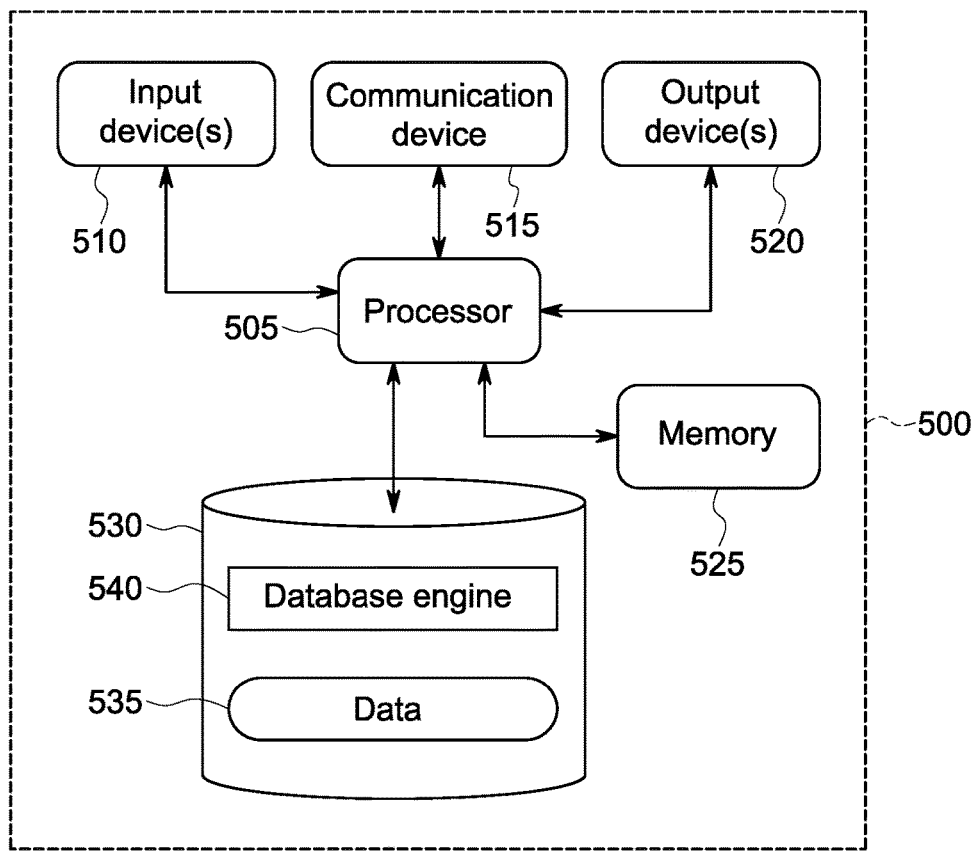
FIG. 5 illustrates a system according to some embodiments.
FIG. 6 illustrates a portion of a database according to some embodiments.

Note the embodiments described herein may be implemented using any number of different hardware configurations. For example, FIG. 5 illustrates a relationship platform 500 that may be, for example, associated with the system 100 of FIG. 1. The relationship platform 500 may provide a technical and commercial advantage by receiving a training set of sentences comprising labeled objects and subjects for creating an initial relationship model and display determined objects and subjects from unlabeled sentences for feedback.

The relationship platform 500 may comprise a processor 505 ("processor"), such as one or more commercially available Central Processing Units (CPUs), coupled to a communication device 515 configured to communicate via a communication network (not shown in FIG. 5). The communication device 515 may be used to communicate, for example, with one or more users. The relationship platform 500 further includes an input device 510 (e.g., a mouse and/or keyboard to enter information about relations) and an output device 520 (e.g., to output and display the data to a user).

The processor 505 also communicates with a memory/storage device 530 that stores data 535. The storage device 530 may comprise any appropriate information storage device, including combinations of magnetic storage devices (e.g., a hard disk drive), optical storage devices, mobile telephones, and/or semiconductor memory devices. The storage device 530 may store a program and/or processing logic for controlling the processor 510. The processor 505 performs instructions of the programs, and thereby operates in accordance with any of the embodiments described herein. For example, the processor 505 may receive data such as, but not limited to, unannotated sentences and may create a model based on the received data.

The programs may be stored in a compiled, compressed, uncompiled and/or encrypted format or a combination. The programs may furthermore include other program elements, such as an operating system, a database management system, and/or device drivers used by the processor 505 to interface with peripheral devices. The storage device 530 may comprise or may function in conjunction with a database engine 540 to read and write to a database such as database 600.

FIG. 6 is a tabular view of a portion of a database 600 in accordance with some embodiments of the present invention. The table includes entries associated with text documents such as, but not limited to, syntactic and semantic properties. The table also defines fields 602, 604, 606, 608, 610 and 612 for each of the entries. The fields, for example, may specify: a document ID 602, a first syntactic or semantic property 604, a second syntactic or semantic property 606, a third syntactic or semantic property 608, a fourth syntactic or semantic property 610, and an nth syntactic or semantic property 612. The information in the database 600 may be periodically created and updated based on the examination of each newly received unstructured and unannotated text document.

The document ID 602 might be a unique alphanumeric code identifying a specific document and the syntactic or semantic properties 602/604/606/608/610/612 might provide information related to features associated with a specific document such as, but not limited to, subjects and objects and their associated spellings, meanings, variants, and synonyms.

As used herein, information may be "received" by or "transmitted" to, for example: (i) the relationship platform 500 from another device; or (ii) a software application or module within the relationship platform 500 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The process flow and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a geometrical compensation module. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A method to extract relationships from text, the method comprising:
   receiving a training set of sentences comprising labeled objects and subjects for creating an initial relationship model;
   receiving a set of unlabeled sentences;
   determining, via a processor, objects and subjects from the set of unlabeled sentences based on the initial model;
   displaying the determined objects and subjects from the set of unlabeled sentences to a user for feedback and approval;
   receiving an indication of whether the determined objects and subjects from the set of unlabeled sentences are correct; and
   updating the initial relationship model based on the received indication,
   wherein creating the initial relationship model comprises executing a concept tagger against the training set of sentences to determine a domain and range of the sentences, wherein the domain and range is determined based upon a most frequently occurring subject-object semantic type pair.

2. The method of claim 1, wherein the training set of sentences comprises less than thirty sentences.

3. The method of claim 1, wherein creating the initial relationship model further comprises extracting word tokens from the training set of sentences wherein word tokens comprise words that are located between the subjects and the objects.

4. The method of claim 3, wherein creating the initial relationship model further comprises determining extended word tokens comprising synonyms of the extracted word tokens.

5. The method of claim 4, wherein the extended word tokens are weighted based on a similarity to the extracted word tokens.

6. A non-transitory computer-readable medium comprising instructions that when executed by a processor perform a method to extract relationships from text, the method comprising:
- receiving a training set of sentences comprising labeled objects and subjects for creating an initial relationship model;
- receiving a set of unlabeled sentences;
- determining, via a processor, objects and subjects from the set of unlabeled sentences based on the initial model;
- displaying the determined objects and subjects from the set of unlabeled sentences to a user for feedback and approval;
- receiving an indication of whether the determined objects and subjects from the set of unlabeled sentences are correct; and
- updating the initial relationship model based on the received indication,
- wherein creating the initial relationship model comprises executing a concept tagger against the training set of sentences to determine a domain and range of the sentences, wherein the domain and range is determined based upon a most frequently occurring subject-object semantic type pair.

7. The medium of claim 6, wherein the training set of sentences comprises less than thirty sentences.

8. The medium of claim 6, wherein creating the initial relationship model further comprises extracting word tokens from the training set of sentences wherein word tokens comprise words that are located between the subjects and the objects.

9. The medium of claim 6, wherein creating the initial relationship model further comprises determining extended word tokens comprising synonyms of the extracted word tokens.

10. The medium of claim 9, wherein the extended word tokens are weighted based on a similarity to the extracted word tokens.

11. A system to determine an asset event, the system comprising:
- a processor; and
- a non-transitory computer-readable medium comprising instructions that when executed by the processor perform a method to extract relationships from text, the method comprising:
- receiving a training set of sentences comprising labeled objects and subjects for creating an initial relationship model;
- receiving a set of unlabeled sentences;
- determining objects and subjects from the set of unlabeled sentences based on the initial model;
- displaying the determined objects and subjects from the set of unlabeled sentences to a user for feedback and approval;
- receiving an indication of whether the determined objects and subjects from the set of unlabeled sentences are correct; and
- updating the initial relationship model based on the received indication,
- wherein creating the initial relationship model comprises executing a concept tagger against the training set of sentences to determine a domain and range of the sentences, wherein the domain and range is determined based upon a most frequently occurring subject-object semantic type pair.

12. The system of claim 11, wherein the training set of sentences comprises less than thirty sentences.

13. The system of claim 11, wherein creating the initial relationship model further comprises extracting word tokens from the training set of sentences wherein word tokens comprise words that are located between the subjects and the objects.

14. The system of claim 13, wherein creating the initial relationship model further comprises determining extended word tokens comprising synonyms of the extracted word tokens.

15. The system of claim 14, wherein the extended word tokens are weighted based on a similarity to the extracted word tokens.

* * * * *